United States Patent [19]
Kohashi

[11] 4,010,321
[45] Mar. 1, 1977

[54] LIGHT MODULATING DEVICE USING SCHLIEREN LENS SYSTEM

[75] Inventor: Tadao Kohashi, Kawasaki, Japan

[73] Assignee: Matsushita Electric Industrial Co., Ltd., Kadoma, Japan

[22] Filed: Oct. 19, 1973

[21] Appl. No.: 407,834

[30] Foreign Application Priority Data
Oct. 20, 1972 Japan .............................. 47-105491
Dec. 12, 1972 Japan .............................. 47-125596

[52] U.S. Cl. ........................ 358/233; 315/169 TV; 350/160 R
[51] Int. Cl.² ........................................ H04N 5/66
[58] Field of Search ........... 178/7.3 D, 7.5 D, 7.87; 358/62; 350/160 R, 161; 315/169 TV

[56] References Cited
UNITED STATES PATENTS

| | | | |
|---|---|---|---|
| 3,274,565 | 9/1966 | Wright | 178/7.5 D X |
| 3,538,251 | 11/1970 | Gear | 178/7.5 D X |
| 3,668,106 | 6/1972 | Ota | 350/160 R |
| 3,708,219 | 1/1973 | Forlini et al. | 350/160 R |

Primary Examiner—Robert L. Richardson

[57] ABSTRACT

An electroosmotically movable liquid film is caused to vary its thickness by local loop currents produced by a charge pattern representing an image developed across the film surface, thus forming local gradients which are proportional to the amount of deposited charges. Streaks of light formed by a first aperture grille are refracted as they pass through the gradients in the liquid film and intensity-modulated by a second aperture grille to form replica of the image charge pattern.

39 Claims, 16 Drawing Figures

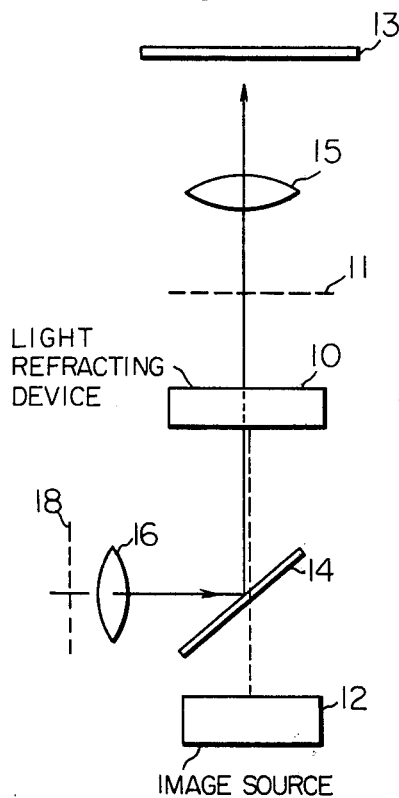
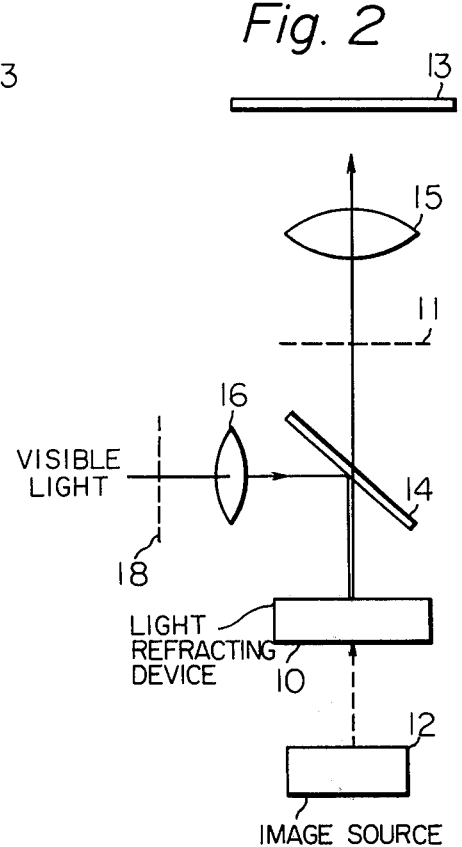
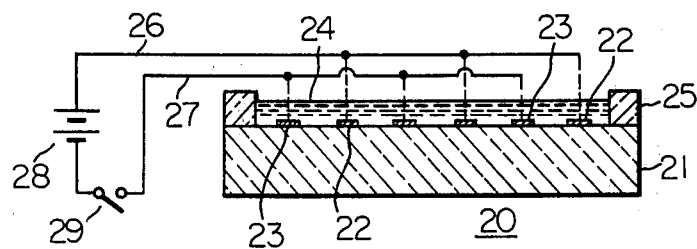

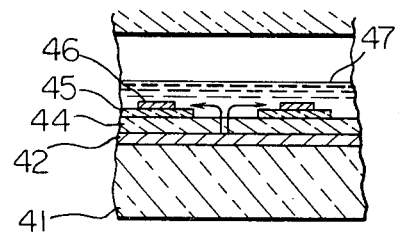
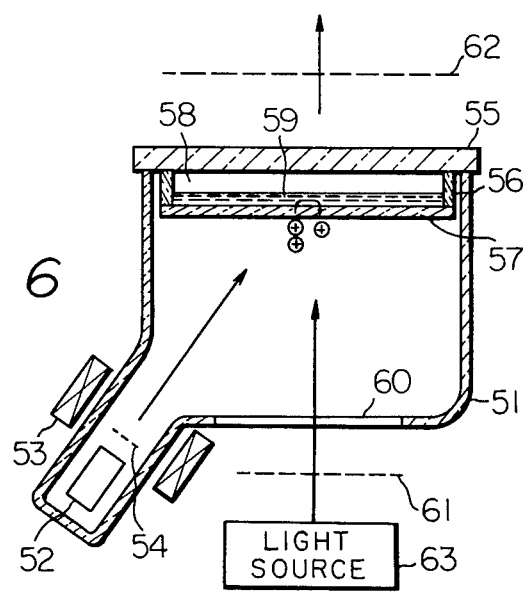
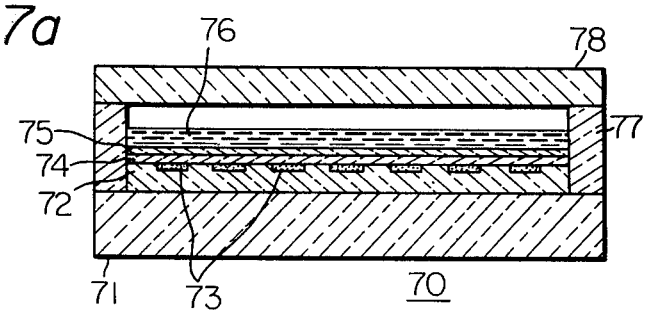

LIGHT MODULATING DEVICE USING SCHLIEREN LENS SYSTEM

The present invention relates generally to light modulating devices, and in particular to a light modulating device of the type wherein an electroosmotically movable liquid film is moved laterally by a charged pattern causing visible streaks of light incident on the liquid film to be refracted in accordance with the charge pattern and modulated by means of an aperture grille to reconstruct the original image on an enlarged scale.

A light modulating device presently known to the art involves directly bombarding a light refracting film with a beam of highly accelerated electrons and producing a positively charged pattern on the surface of the electron beam side of the film. Negative charges develop on the other surface, thereby causing it to be attracted to the surface causes the electron beam side by the electrostatic force. This cuases the film to vary in thickness by an amount proportional to the amount of charges developed. The charge pattern is formed on the film when scanning it by an electron beam in acordance with an image signal, the electrons in the beam being accelerated to a high speed by a potential level selected to deposit enough charges to cause deformation of the liquid film. In the prior art device, repeated bombardments by the highly accelerated electron beam would adversely affect the deformable oil film to vaporize it in the evacuated envelope reducing the vacuum pressure, thereby reducing the usable life time of the device.

It is therefore an object of the present invention to provide an improved light modulating device which is free from disadvantages which have been experienced in the prior art device.

Another object of the invention is to provide a light modulating device which permits a wide range of materials to be used for a light refracting liquid film for a wide range of applications.

A further object of the invention is to provide a light modulating device wherein an image of the blue or ultraviolet region of the spectrum is converted into a visible light image.

It is yet another object of the invention to provide a light modulating device which projects a television screen image of conventional size onto a large screen at an intensified light level.

Briefly described, the present invention is characterized by the use of an electroosmotically movable liquid material in the form of a thin film placed on a flat supporting member to assure a uniform thickness under normal conditions. The electroosmotically movable liquid may include tricresyl phosphate and is caused to electrically polarized with respect to the supporting member which may be quartz or any other material having a dielectric constant differing from that of the liquid film. When a charge pattern is formed in the film, currents are caused to flow in microscopic loops across the potential differences developed by the charge, and the lateral current components in the film cause portions of the liquid to polarize and move in a preferred direction. The movement of the liquid causes variations in the film thickness in accordance with the charge pattern. Visible light passing through a plurality of slits formed by a first grille is initially adjusted by means of a lens system so that it focusses on a second grille placed adjacent the liquid film remote from the first grille in the light path. The light is caused to refract in proportion to gradients formed by the thickness variations as it passes through the liquid film. The refracted light is modulated in intensity by means of the second grille and projected onto a screen located at a distance from the second grille. The image thus formed on the screen is positive if the initial adjustment is such that the light passes through the second grille at minimum intensity, while the image is negative if the initial adjustment provides a maximum light intensity. The arrangement of the two grilles and lens system constitutes a well known Schlieren lens system. The liquid material usable in the present invention should preferably have the properties of (1) transparency to visible light, (2) low vapor pressure at ambient temperature to ensure longer usable life time, (3) a low vapor absorption rate, and (4) a high boiling point. Tricresyl phosphate employed in the practice of the present invention meets these requirements. In accordance with a first aspect of the invention an image pattern is formed by means of spaced electrodes at opposite potentials with a photoconductive film placed in contact with the electrodes. The incident optical image of the blue or ultraviolet region of the spectrum causes the photoconductive resistance to vary causing corresponding variations in the potentials across the electrodes. The electrodes can be arranged at a spacing such that the system can operate with a voltage level of the order of a few volts. In accordance with another aspect of the invention an image pattern is formed by scanning the surface of a supporting member on which the electroosmotic liquid is placed in an evacuated envelope with a beam of electrons to deposit positive charges of varying intensity in accordance with an image signal. Loop currents will flow between the charges of different intensity causing the liquid to move laterally of the film to vary its thickness. In still another aspect of the invention there is provided an array of p-n junctions in contact with an electroosmotic liquid film wherein an incident optical image on the array causes the p-n junctions to develop opposite charges across its depletion layer in accordance with the incident optical image.

Other objects and features of the present invention will become apparent from the following description taken in conjunction with the accompanying drawings, in which:

FIG. 1 is a schematic view of a general arrangement of a light modulating device in accordance with tbe present invention;

FIG. 2 is a schematic view of another arrangement of a light modulating device in accordance with the present invention;

FIGS. 3a and 3b are cross-sectional views of a first preferred embodiment of a light refracting device of the present invention;

FIGS. 5a and 5b are cross-sectional views of a third preferred embodiment of a light refracting device of the invention;

FIG. 6 is a cross-sectional view of a fourth preferred embodiment of a light refracting device of the invention;

FIGS. 7a and 7b are cross-sectional views of a fifth preferred embodiment of a light refracting device of the present invention;

FIG. 8 is a cross-sectional view of a first preferred form of the light refracting device of FIG. 7a;

FIG. 9 is a cross-sectional view of another preferred form of the light refracting device of FIG. 7a;

FIGS. 10a and 10b are cross-sectional views of still another preferred form of the light refracting device of FIG. 7a.

Figure 3B:
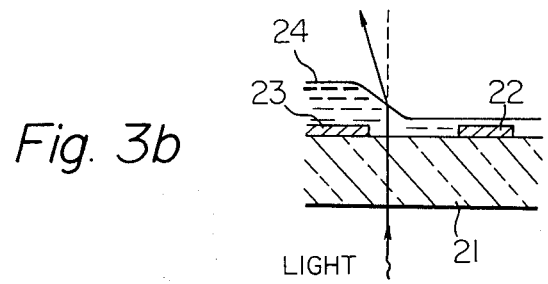

Reference is now made to the accompanying drawings and in particular to FIGS. 1 and 2 in which are shown general arrangements of light modulating devices of the present invention. In FIG. 1 a light refracting device 10 containing an electroosmotically movable liquid film which will be described hereinbelow is shown illuminated by an image source 12 such as, for example, a television screen or ultraviolet radiation source, by way of a half-silvered mirror 14. A charge pattern is formed on the surface of the light refracting device 10 in a manner as will be described hereinbelow, and causes portions of the liquid film to vary its thickness forming gradients at the transition areas between the altered film thicknesses, the gradient in each area being proportional to the intensity of the deposited charges. Visible light passing through a first aperture grille 18 and a lens 16 is reflected at a right angle by the half-silvered mirror 14 and impinges on the input side of the light refracting device 10 whereupon the light is refracted by an amount proportional to the gradients of the film. The visible light is initially adjusted by means of the lens 16 so that it focusses on a second grille 11 positioned adjacent the light refracting device 10 remote from the first grille 18. The adjustment may be made such that the light passes through the second grille either at a maximum light intensity or at a minimum light intensity depending on the particular application. Therefore, the light emerging from the output side of the device 10 forms a plurality of refracted streaks of light. Since the refraction causes the streaks of light to deviate from the original path relative to corresponding gratings of the second grille, the amount of light emerging therefrom is proportional to the variations in the film thickness so that an exact replica of the image pattern is formed on the screen 13 by means of a lens 15 located intermediate between the screen and the second grille. Since the gratings of the first and second grilles are arranged at very narrow spacings, viewers are unable to discriminate individual streaks of light when viewed from a suitable distance. In FIG. 2 a similar arrangement of a light modulating device of the invention is shown. In this case, visible light is reflected on the surface of the light refracting device 10 by positioning the half-silvered mirror 14 at an intermediate location between the light refracting device and the second grille 11.

In FIG. 3a, a first preferred embodiment of a light refracting device 20 of the present invention is shown and comprises a supporting member 21 made of a light-pervious material such as quartz on which a plurality of parallel light-pervious electrodes 22 and 23 are disposed. The parallel electrodes are made of tin oxide having a width of 100 microns and arranged at a spacing of 100 microns. A layer of an electroosmotically movable liquid 24, preferably tricresyl phosphate, overlays the surfaces of the supporting member and electrodes to a thickness of 200 microns. The numeral 25 designates a frame or bank made of plastic to hold the liquid layer in place. The electrodes 22 and 23 are respectively connected through leads 26, 27 and a switch 29 to the positive and negative polarity terminals of a D.C. voltage source 28. The light refracting device 20 is held in a horizontal plane to provide uniform thickness across the surface of the liquid layer 24 under normal conditions. When the switch 29 is closed electrodes 22 become positive with respect to electrodes 23 causing lateral current flow in the liquid. By the passage of the current, the portion of liquid that overlaps the electrodes 22, is caused to move towards electrodes 23 at negative potential, thus causing a variation in the layer thickness as shown in FIG. 3b. The surface contour of the liquid is thus disturbed by the lateral movement of the liquid. When light is made to be incident on the lower side of the device 20, the light which passes through the disturbed contour of the film will deflect its path and emerge from the upper surface at an angle relative to the angle of incidence. Since this angle of deflection is in proportion to the degree of surface disturbance, it represents the magnitude of charge or potential at electrodes 22 and 23. Therefore, if the light refracting device 20 is suitably placed in the system of FIG. 1, a plurality of streaks of light appears on the screen 13. When the potential is removed from electrodes 22 and 23, the surface contour will be restored to the original state at a speed determined by the surface tension and viscosity of the liquid material. If the potentials are reversed, the portion of liquid that overlaps electrodes 23 will move towards the electrodes 22. It has been found that for tricresyl phosphate, the liquid movement can be effected by application of a field intensity of $10^{-2}$ volts/micron, and therefore, only a total voltage of 1 to 10 volts is required under the conditions of the experiments. Although the incident light has been described as passing through the device 20 from the side opposite to the liquid film, it will be understood that the same effect can equally be provided if the light is incident on the liquid film side of the device.

The speed at which the liquid responds to applied voltage is largely dependent on its viscosity. The viscosity can be controlled by adding into the liquid a suitable amount of a light-pervious solid substance or light-pervious solution. For tricresyl phosphate as the liquid film, polyvinyl and epoxy resins are suitable for increasing the viscosity, while organic solvents such as alcohol, ethers and benzene serve to decrease the viscosity. The response time is also dependent on the dielectric relaxation time constant of the liquid which can be controlled by adding a suitable substance having a different resistivity from that of the liquid.

Figure 4A:
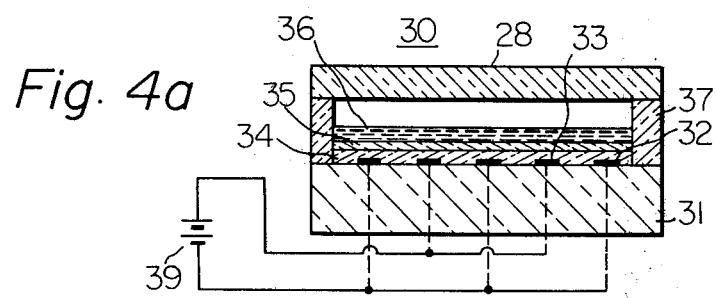
FIGS. 4a and 4b are cross-sectional views of a second preferred embodiment of a light refracting device of the invention.
Figure 4B:
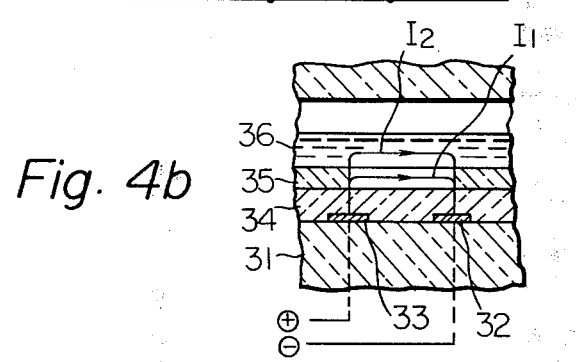

In FIGS. 4a and 4b, a second preferred embodiment of a light refracting device 30 in accordance with the present invention is shown and comprises a light-pervious member 31, preferably of soda lime glass, on the upper surface of which is deposited a plurality of parallel electrodes 32 and 33, which are made of a light-pervious material such as, for example, tin oxide or indium oxide. These electrodes are 100 microns wide and arranged at a spacing of 100 microns. A transparent electrically resistive layer 34 thinner than the spacings of the electrodes 32 and 33 covers the surfaces of the substrate 31 and the electrodes. The layer 34 may preferably be glass enamel or epoxy resin 20 to 30 microns thick. A transparent photoconductive film 35, which is, for example, polyvinylcarbazole resin, covers the resistive film 34. The photoconductive film 35 is thinner than the electrode spacings, preferably 10 to 20 microns and only responds to the blue and ultraviolet regions of the spectrum in a manner to decrease its resistance, while it transmits the red light region of the spectrum. It is to be noted that the combined thickness of films 34 and 35 should also be smaller than the electrode spacing. Numberal 36 indicates a light refracting liquid film 100 microns thick as previously described and is disposed on the upper surface of the photoconductive film 35. A spacer 37 is provided at the periphery of the substrate 31 to hold the liquid film layer 36 and serves also as a supporting member for a transparent cover 38. The cover 38 and spacer 37 define a closed chamber to protect the liquid film from contamination by unwanted foreign particles and vapors. It is to be noted that the dark resistivity of the photoconductive film 35 and the resistivity of the film 34 should be suitably higher than that of the liquid film 36, and that the resistivity of the film 34 should be equal to or greater than the dark resistivity of the photoconductive film 35. The electrodes 32 and 33 are connected, respectively, to the negative and positive terminals of a power source 39 to provide a uniform electric field between the electrodes. Under normal conditions, loop current $I_1$ flows from the positive to negative electrodes through the plane of the photoconductive film 35; similarly, loop current $I_2$ flows along the plane of liquid film 36 in parallel with current $I_1$. Since the photoconductive film has a higher resistance than that of the liquid film, current $I_2$ is greater than $I_1$. The current $I_2$ causes the liquid to move towards the negative electrodes 32, increasing the liquid thickness directly above the electrodes 32, while decreasing the liquid thickness directly above the positive electrodes 33, thus forming gradients at the transitions of thickness variations between the electrodes. Therefore, a plurality of streaks of film deformations occurs in parallel with the electrodes. When the liquid film is uniformly illuminated with the red or yellow light region of the spectrum, streaks of red or yellow light are caused to refract by the gradients and follow a path deviating from the original path which is otherwise followed when the device 30 is not energized. When the liquid film 36 is subjected to an imagewise radiation of the blue or ultraviolet region of the spectrum, the radiation causes a reduction in resistance across the surface of the photoconductive film 35 corresponding to the incident image. The reduction in the photoconductive resistance causes an increase in current $I_1$ and a decrease in current $I_2$, and therefore, that portions of the liquid film which have been altered in thickness are caused to move toward the normal position by an amount proportional to the intensity of film thickness the incident optical image. The uniform illumination by the red or yellow light causes a pattern of image to appear on the screen 13 if the light refracting device 30 is suitably employed in the arrangement of FIG. 1. The light refracting device 30 can be operated at voltage levels around 10 volts, the variation of which allows corresponding variations in the image contrast, sensitivity to the incident image radiation and other operating characteristics of the device. In one preferred form of the present embodiment, the transparent member 38 is covered with an optical filter which passes the red and yellow light regions of the spectrum so that the unwanted ultraviolet region of the spectrum is intercepted, which region would otherwise cause degradation of the image quality on the screen. In the foregoing description, the electrodes 32 and 33 have been described as having a property of light transparency. However, these electrodes may be made opaque by deposition of a material such as graphite or a metal in order to provide a plurality of slits. This eliminates the provision of the first grille 18 of general arrangement of FIG. 1.

Figure 5A:
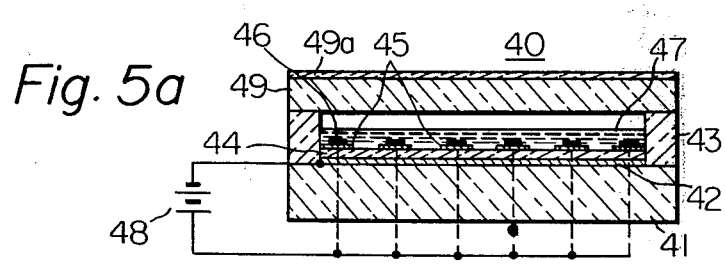

FIGS. 5a and 5b illustrate a third preferred embodiment of the present invention in which numeral 41 designates a transparent substrate on which a transparent electrode 42 in the form of a thin film and a frame or bank 43 are provided in a manner similar to the previous embodiments. Numeral 44 indicates a light-pervious photoconductive film perferably of polyvinyl-carbazole 10 to 20 microns thick covering the electrode 42. The photoconductive film, as in the second embodiment, is sensitive only to the blue and ultraviolet regions of the spectrum. A grid or aperture electrode 46 having a plurality of parallel strip conductors is provided on the photoconductive film. These strip conductors are spaced apart from each other at a distance greater than the thickness of the photoconductive film. Between the aperture electrode 46 and the photoconductive film 44 are interposed insulating regions 45 a few microns thick preferably of silicon dioxide. Thus, the electrodes 42 and 46 form spaced electrodes to which voltages of opposite polarities are applied from a power source 48. It will be understood from the previous description that the electrode 46 may be made either transparent or opaque depending on the arrangement of a Schlieren lens system. The numeral 47 indicates the light refracting liquid film referred to above covering the surfaces of the photoconductive film 44 and electrode 46. Since the insulating regions 45 serve to prevent the shortest passage of current across the photoconductive film, the currents will flow in a manner circumventing the periphery of the insulating regions as shown in FIG. 5b and thus horizontal current components occur along the plane of the liquid film to contribute to the movement of the liquid. Under normal conditions, the passage of currents causes that portion of liquid which is intermediate between adjacent strip conductors to move sideways, causing liquid surface deformations in a manner similar to that described in the second embodiment. The light refracting device 40 further comprises a transparent cover 49 arranged on the frame or bank 43 defining with the bank 43 a closed chamber and an optical filter which passes the red light region of the spectrum. When the device 40 is subjected to an imagewise radiation of the blue or ultraviolet region of the spectrum, the liquid film is further modulated by the image as previously described.

FIG. 6 illustrates a fourth preferred embodiment of a light refracting device of the present invention. A light refracting device 50 comprises an evacuated envelope 51 having at one end thereof an electron beam source 52, a grid 54 for modulating the intensity of the electron beam and a deflecting coil 53 and at the other end a transparent faceplate 55. On the inner surface of the faceplate is attached a supporting member 56 of a conductive material to which a light pervious substrate 57 is fused to define a closed chamber 58. The conductive supporting member 56 is positively biased with respect to the electron beam source 52 to a potential lower than the potential at which the electron of the beam are accelerated so as to provide a leakage path for the positive charge accumulated on the substrate. The substrate 57 may be a glass member 30 to 100 microns thick, have a suitable specific resistivity and carry thereon in the chamber 58 an electrically polarizable liquid film 59 preferably of tricresyl phosphate 50 to 100 microns thick similar to that described in the previous embodiments. The evacuated envelope 51 has a window 60 for admitting visible light. The window 60 is positioned between two aperture grids 61, 62 such that the substrate 57 is illuminated by streaks of white light formed by passing the light from a light source 63 through the slits of the aperture grid 61. The electrons of the signal-modulated electron beam are accelerated to a high speed so as to impinge on the substrate 57 at a secondary emission ratio greater than unity. As the substrate is swept across by the impinging electrons of the beam, positive charges develop on the substrate suface in correspondence with the image signal with which the electron beam is modulated. Loop currents flow across charged potential differences through the plane of the liquid film 59 as shown by an arrow in FIG. 6. By the passage of the currents, the liquid is caused to move towards the less charged portions by an amount proportional to the difference in the magnitude of charges developed. Therefore, the less charged portions of the liquid film become thicker than the higher charged portions, thus forming a gradient of thickness between them. If glycerin is used as the liquid rather than tricresyl phosphate, the liquid moves towards the higher charged portions which becomes thicker than the less charged portions. The light passing through the liquid film is thus refracted by an amount proportional to the gradient, and hence to the intensity of the charged image. The refracted streaks of light are converted into intensity-modulated light by means of the aperture grid 62 as previously described. The image focussed on the screen (not shown) is a portray of the transitions of the signal applied on the grid 54 of the evacuated envelope 51, since the intensity of the image is only proportional to the differentiated value, or gradient of the signal. Therefore, the image represents the contour lines of the original picture, which are useful for displaying characters or symbols.

Figure 7B:
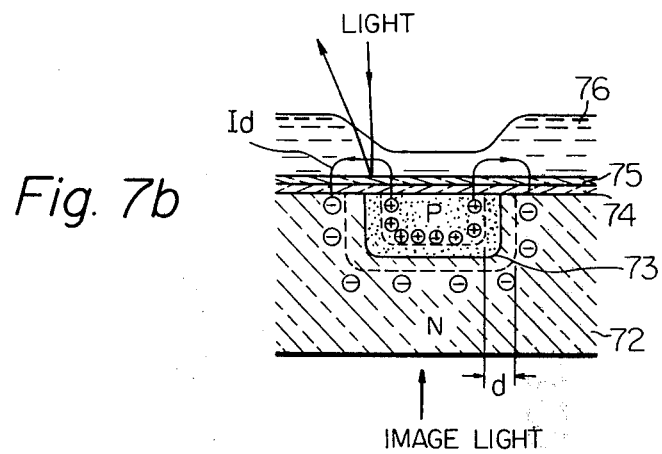

The foregoing description has been concerned with light refracting devices in which image patterns are produced by variation of photoconductive resistance or by impingement by electrons. Image patterns can also be produced by converting optical energy into electrical energy by means of an array of photoelectrical regions having p-type conductivity on an n-type semiconductive substrate on which the photoelectrical array is deposited. Such an array of photoelectrical regions includes p-n junctions diffused in a silicon or gallium arsenide substrate, electrochemical junctions between $Cu_2S$ and semiconductive substrate such as CdS, CdS-ZnS, etc., or metal-semiconductor junctions between $Cu_2O$ and a metal substrate. These photovoltaic elements, when excited by radiation, cause opposite charges of 0.3 to 0.8 volts to develop across a depletion layer. Since the width of the depletion layer ranges from 0.1 to 1 micron, the equivalent electrical energy produced per micron of thickness across the layer suffices the voltage required for causing the liquid film to move, which is $10^{-2}$ volts per micron of thickness. If the liquid film is arranged such that the junctions discharge local currents through the plane of the liquid film, the liquid is caused to move in a preferred direction by an amount proportional to the voltage developed across the depletion layer. A fifth preferred embodiment of the invention is shown in FIGS. 7a and 7b and comprises a light refracting device 70, which in turn comprises a transparent member 71 on which a semiconductive substrate 72 preferably on n-type silicon is bonded by a transparent adhesvie. An array of p-type regions 73 is formed on the surface of the silicon substrate by doping acceptor impurities. The substrate is covered with a light-intercepting film 74 and a light-reflecting film 75 on which a liquid film 76 of an electrically polarizable material as previously described is disposed and kept in place by a support 77. A transparent member 78 is provided on the support 77 for providing protection of the liquid film from contamination. The silicon substrate 72 has a thickness of preferably 20 microns to permit the incident optical energy to penetrate well into deeper regions for efficient conversion of optical energy into electrical energy. The p-n junctions comprise either dots 20 to 1000 microns in diameter or squares 20 to 1000 microns square at a spacing of from 40 to 2000 microns and may be fabricated by doping an acceptor impurity such as boron in the usual diffusion method. The array of the opposite conductivity type regions may also be produced by first depositing on the supporting member a 20 micron thick layer of a compound such as CdS, CdS-CdSe, or CdS-ZnS from a vapor phase as in the usual manner of deposition. The layer serves as an n-type substrate on which the p-type conductivity regions such as $Cu_2S$ are deposited by first photoetching selective regions and then providing an electrochemical reaction between the substrate and a cuprous chloride solution.

The light intercepting film 74 is an opaque member provided for the purpose of preventing visible light incident on the liquid film side of the device from producing electrical energy as well as preventing an optical image incident on the opposite side from penetrating the device. The light-intercepting member 74 may be made by deposition of an opaque cermet film such as $MgF_2$ and In or may be made by applying a mixture of carbon black powder and epoxy or silicon resin to a thickness sufficient to provide light opaqueness, for example, 0.1 to 2 microns on the surfaces of the substrate 72 and the p-type regions 73. Various methods are available for fabricating the light-reflecting film 75. For example, the film 75 may be made reflective to light of a given wavelength by depositing ZnS or $TiO_2$ to a thickness of $(n + \frac{1}{4})\lambda$ (where $n$ is a positive integer including zero, and $\lambda$ is the given wavelength) or by depositing multilayers of light reflective materials wherein interference occurs between light of unwanted wavelengths, or may be made reflective to light of the full wavelength range by depositing a white reflective material such as a mixture of $TiO_2$ or $BaTiO_3$ powder with epoxy or silicon resin to a thickness of 0.1 to 2 microns on the light intercepting member 74. The light-reflective film providing reflection to light of the full wavelength range may either comprise a multilayer of materials such as dielectric mirror comprising ZnS and $MgF_2$ (having refractive indices greatly differing from each other to provide total internal reflections at the interfaces), or a material having a refractive index greatly differing from that of the liquid film 76 to provide reflection at the interface. On the other hand, if such a dielectric mirror completely reflects the visible light incident on the liquid film 76, the light-intercepting film 74 may be omitted. In a still preferred form of the invention for achieving light reflection and interception, both of the films 74 and 75 may be omitted if the refractive indices of the polarizable liquid and the substrate 72 are chosen such that reflection occurs on the opposite sides of the interface therebetween.

In operation, the light-refracting device 70 is placed in the position of the device 10 of the arrangement of FIG. 2. An optical image from the image source 12 is arranged to strike the supporting member 71 and penetrate therethrough to excite the p-n junction, causing opposite charges to be generated across the depletion layer of the junctions (shown in broken lines in FIG. 7b). The generated charges cause local loop currents to flow bypassing the liquid film 76. The portion of the liquid directly above the p-type region is caused to move sideways, thus deforming the film building gradients directly above the p-n junctions. Since opposite charges occur across the depletion layer which is usually 0.1 to 1 micron thick, the depletion layer can be thought of as having a pair of electrodes at a spacing therebetween which will be hereinbelow referred to as an equivalent electrode spacing $d$. Visible light passes through the aperture grid 18 and is reflected at the half mirror 14 or a dichroic mirror to the light refracting device 70. The incident streaks of light are reflected on the surface of the light-reflecting film 75 and refracted as they emerge from the liquid surface by an amount proportional to the gradient. It will be understood from the previous description that an optical scene imaged on the p-n junctions produces a corresponding charged pattern which in turn produces local loop currents across the opposite charges and the currents passing through the plane of the liquid film cause it to move in response thereto. Since the p-n junctions can generate charges of a sufficient magnitude to cause movement of the liquid film, even with a low incident light level, a conventional television image can be utilized as an input optical image source. The input optical image may be any other radiation which includes infrared light, ultraviolet light, X-rays or gamma rays. In the case of these invisible radiations, they may also be allowed to penetrate the liquid film of the device. The liquid film 76 is tricresyl phosphate 10 to 50 microns thick as previously described.

In order to achieve efficient film deformation, it is necessary to allow the charges developed to generate currents effectively through the liquid film. The preferred value of resistivity of the light reflecting film that underlies the liquid is up to 100 times greater than that of the latter. Assuming that the tricresyl phosphate has a resistivity of $10^9$ ohm-centimeters, the light reflecting layer 75 has preferably a resistivity of $10^9$ to $10^{11}$ ohm-centimeters.

Figure 8:
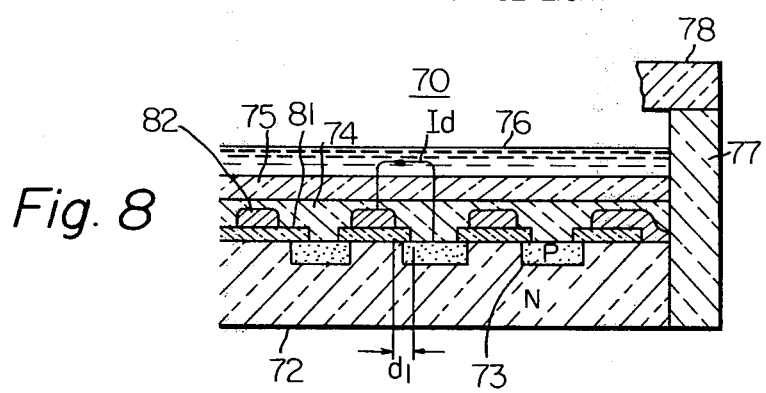
Figure 9:
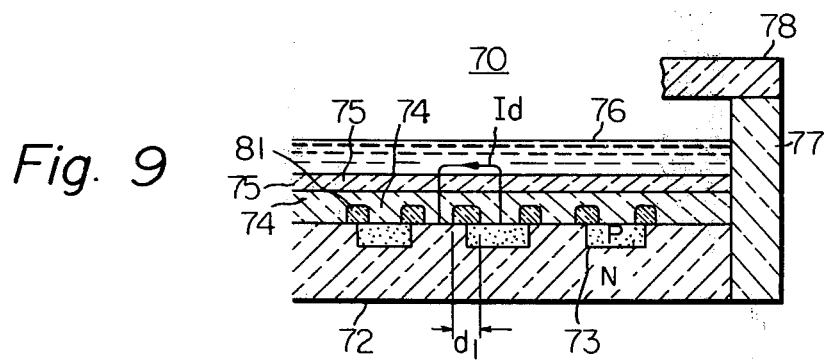

FIG. 8 illustrates a preferred form of the present embodiment wherein the relative proportions of the elements are exaggerated for the sake of clarity. In FIG. 8, the portions of the p-n junctions which are adjacent the upper surface thereof are covered with an insulating protective film, such as silicon dioxide, 20 to 30 microns thick as designated by numeral 81. Since the p-type regions may take the form of dots (circular or square) or strips, the shape of the insulating film 81 may be that of a perforated film or parallel strips. A perforated electrode 82 preferably of gold or aluminum overlies the protective film 81 and provides an ohmic contact with the n-type silicon substrate 72. Thus, the currents $I_d$ induced by the charged pattern flow in a direction as shown by the arrow between the p-type regions and the electrode 82 which has the same potential as the substrate. The protective film 81 in combination with the electrode 82 serves the dual purposes of preventing deterioration of the silicon p-n junctions by surface contamination and of increasing the equivalent electrode spacing $d$ to that shown in FIG. 8 in which the spacing is represented by $d_1$ measured from the edge of the protective film 81 to the edge of the electrode 82. The increased spacing $d_1$ prevents optical interference effect which might otherwise occur between lights of different wavelength due to the narrow equivalent electrode spacing of the depletion layer. The preferred value of the equivalent electrode spacing $d$ is 2 to 10 microns which value substantially prevents the optical interference effect, thus enabling the device to be usable for the full range of the spectrum. An optical image incident on the p-n junctions in a manner as previously described causes opposite charges to occur which in turn cause loop currents $I_d$ to pass through the liquid film 76 as shown in FIG. 8 between the p-type regions and the electrode 82. Since the length of the liquid film is greater than the equivalent electrode spacing $d_1$, the liquid is caused to move by an amount sufficient to prevent the optical interference effect. The electrode 82 can be omitted if the protective insulating films 81 are etched as shown in FIG. 9 so that the etched portions allow loop currents to pass therethrough to the substrate. It is to be noted that the protective film 81 should cover the periphery of the p-n junction to provide an equivalent electrode spacing substantially equal to a spacing $d_1$, which is preferably 2 to 10 microns.

Figure 10A:
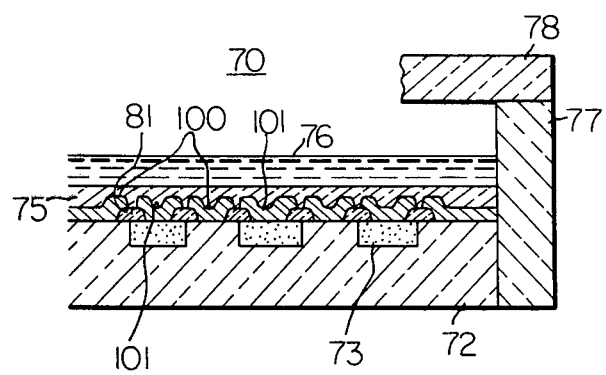
Figure 10B:
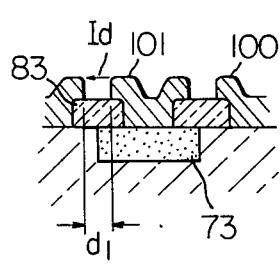
Figure 10C:
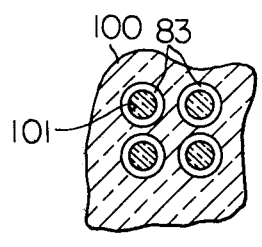
FIG. 10c is a fragmentary plan view of the light refracting device.

In order to assure a good ohmic contact between the substrate and the p-type regions, conductive films 100 and 101, preferably gold or aluminum, may be provided on the surface of the insulating film 81, the p-type regions 73 and the substrate 72 as shown in FIG. 10a at a spacing equal to the equivalent electrode spacing $d_1$ (FIG. 10b). This allows the insulating films 81 to be suitably spaced apart from each other to facilitate deposition thereof since the equivalent electrode spacing is solely determined by the spacing between the conductive films 100 and 101. Since, the surface of the substrate is entirely covered with the light opaque material and thus the light-intercepting film as referred to above can be eliminated as shown in FIG. 10a. FIG. 10c is a plan view of the top surface of the device of FIG. 10a wherein the conductive films 81 are arranged in the form of dots on the dot-shaped p-type regions (not shown).

What is claimed is:

1. A light modulating device comprising: a support; a layer of electrokinetically mobile liquid on said support; and a pair of electrodes extending parallel to said liquid layer and adapted to be biased at potentials of opposite polarities, one of said electrodes adjacent said liquid layer being provided with a plurality of apertured regions to produce electric fields therein, a portion of each electric field extending parallel to said liquid layer to produce therein a plurality of lateral flows of current to disturb surface contour of the liquid.

2. A light modulating device as claimed in claim 1, wherein said electrodes comprise a first group of elongated transversely spaced conductive elements at a first potential and a second group of elongated transversely spaced conductive elements at a second potential, conductive elements of the first group being alternate relative to the conductive elements of the second group.

3. A light modulating device as claimed in claim 1, wherein said electrodes comprise a conductive film on said support biased at a first potential and a plurality of parallel elongated conductive elements at a second potential arranged on a plane uniformly spaced from said conductive film.

4. A light modulating device as claimed in claim 1, wherein said electrodes comprise a conductive film on said support biased at a first potential and a perforated conductive film uniformly spaced from the first-mentioned conductive film.

5. A light modulating device as claimed in claim 1, further comprising a photoconductive film disposed between said support and said liquid layer.

6. A light modulating device as claimed in claim 5, wherein said electrodes comprise a conductive film on said support biased at a first potential and a plurality of parallel conductive strips biased at a second potential arranged on a plane uniformly spaced from said conductive film, and wherein said photoconductive film is disposed between said conductive film and said conductive strips.

7. A light modulating device as claimed in claim 5, wherein said electrodes comprise a conductive film on said support biased at a first potential and a perforated conductive film biased at a second potential uniformly spaced from the first-mentioned conductive film, and wherein said photoconductive film is disposed between said conductive films.

8. A light modulating device as claimed in claim 5, further comprising means providing electrical insulation between said electrodes.

9. A light modulating device as claimed in claim 1, wherein said electrodes comprise a semiconductive layer of one conductivity type on said support and a plurality of opposite conductivity type regions juxtaposed in said semiconductive layer to define p-n junctions therewith adjacent said liquid layer.

10. A light modulating device as claimed in claim 9, further comprising a light intercepting layer between said liquid layer and said p-n junctions.

11. A light modulating device as claimed in claim 10, further comprising a light reflecting layer on said light intercepting layer.

12. A light modulating device as claimed in claim 9, wherein the surface portion of each p-n junction is covered with an insulating material.

13. A light modulating device as claimed in claim 12, further comprising a plurality of conductive regions each disposed on said insulating material.

14. A light modulating device as claimed in claim 13, wherein said conductive regions are in ohmic contact with said semiconductive layer and said opposite conductivity regions.

15. A light modulating device as claimed in claim 14, wherein said conductive regions are spaced a distance greater than the thickness of the depetion layer of each p-n junction.

16. A light modulating device as claimed in claim 1, wherein said support is of a dielectric material.

17. A light modulating device as claimed in claim 16, wherein said support is transparent.

18. A light modulating device comprising an electrokinetic mobile liquid, and means including a photoelectrical conversion surface for supporting the liquid in the form of layer, the conversion surface having discrete regions in electrical contact with the liquid layer and sensitive to an imagewise radiation incident thereon to produce lateral current flows in said liquid layer.

19. A light modulating device as claimed in claim 18, wherein said photoelectrical conversion surface includes an array of photoelectrically sensitive p-n junctions to generate electronhole pairs in response to actinic radiation.

20. A light modulating device as claimed in claim 18, wherein said photoelectrical conversion surface includes a pair of electrodes adapted to be connected to a source of potentials, one of the electrodes being provided with a plurality of apertured regions to produce electric fields therein, a portion of each electric field extending parallel to the liquid layer to produce therein a plurality of lateral flows of current.

21. A light modulating device comprising a support of a dielectric material, a layer of electrokinetic mobile liquid on said support, a pair of electrodes extending parallel to the liquid layer and adapted to be connected to a source of potentials, one of the electrodes adjacent the liquid layer being provided with a plurality of apertured regions to produce electric fields therein, a portion of each electric field extending parallel to the liquid layer to produce therein a plurality of lateral flows of current whereby a predetermined pattern of disturbance occurs to the surface contour of the liquid, and a radiation sensitive layer to provide electrical paths of a resistivity lower than that offered by the liquid to the lateral current flows in a direction parallel thereto to serve as a short circuit path for the lateral current flows when illuminated by an imagewise radiation to thereby modulate said pattern of disturbance to the surface contour.

22. A light modulating device as claimed in claim 21 further comprising an electrically resistive layer disposed between said radiation sensitive layer and one of the electrodes, the thickness of the resistive layer being determined in relation to the spacing between said electrodes such that a higher resistance is provided between the electrodes than that offered to the lateral currents.

23. A light modulating device as claimed in claim 22, wherein said electrodes comprise a first group of parallel transversely spaced elongated conductive elements biased at a first potential and a second group of parallel transversely spaced elongated conductive elements biased at a second potential, the elements of the first group being alternate relative to the elements of the second group.

24. A light modulating device as claimed in claim 23, wherein said electrodes are directly disposed on said support, and wherein said resistive layer, radiation sensitive layer and liquid layer are disposed on said electrodes in the order named.

25. A light modulating device as claimed in claim 22, wherein said resistive layer is made of light transmissive material.

26. A light modulating device as claimed in claim 22, wherein the combined thickness of the radiation sensitive layer and resistive layer is smaller than the spacing between the electrodes.

27. A light modulating device as claimed in claim 21, wherein said electrodes comprise a plurality of parallel transversely spaced elongated conductive elements connected in common and a conductive layer in opposed relation to said conductive elements, and wherein said radiation sensitive layer is interposed between said conductive elements and said conductive layer, said elongated elements being disposed in said liquid layer.

28. A light modulating device as claimed in claim 27, further comprising a plurality of electrically resistive strips each being interposed between each conductive element and the radiation sensitive layer.

29. A light modulating device as claimed in claim 21, wherein said support is made of light transmissive material.

30. A light modulating device as claimed in claim 21, wherein said radiation sensitive layer is responsive to the invisible region of the spectrum.

31. A light modulating device comprising, a semiconductive substrate of one conductivity type, a plurality of regions of the opposite conductivity type juxtaposed in said substrate to define p-n junctions therewith, a layer of electrokinetically mobile liquid disposed in electrical contact with the p-n junctions to produce lateral current flows in said liquid layer by electron-hole pairs produced across the p-n junctions when stimulated by an imagewise radiation incident on said substrate, whereby a pattern of disturbance occurs to the surface contour of the liquid as a result of said lateral current flows, and a radiation reflecting layer disposed between the liquid layer and the p-n junctions to reflect radiation incident on said liquid layer to modulate its reflected path in accordance with said pattern of disturbance, the electrical resistivity of the reflecting layer being greater than that of the liquid layer but the thickness thereof being small enough to assure said lateral current flows.

32. A light modulating device as claimed in claim 31, wherein the electrical resistivity of the radiation reflecting layer is up to 100 times greater than that of the liquid layer.

33. A light modulating device as claimed in claim 32, further comprising a second conductive region in ohmic contact with each opposite conductivity region in juxtaposition with the first conductive region.

34. A light modulating device as claimed in claim 31, further comprising an insulating region in overlying relation with each p-n junction to increase the path of said lateral current flows.

35. A light modulating device as claimed in claim 34, wherein said insulating region is silicon dioxide.

36. A light modulating device as claimed in claim 31, further comprising a conductive region in ohmic contact with said substrate.

37. A light modulating device as claimed in claim 31, further comprising a radiation intercepting layer interposed between the radiation reflecting layer and the p-n junctions.

38. A light modulating device as claimed in claim 31, wherein said semiconductive substrate is silicon.

39. A light modulating device as claimed in claim 31, wherein said semiconductive substrate is galium arsenide.

* * * * *